United States Patent
Cheikhzen et al.

(10) Patent No.: US 12,264,607 B1
(45) Date of Patent: Apr. 1, 2025

(54) FILLER-CAP ACTIVATED VALVE IN FILLER-NECK OIL VENT

(71) Applicant: PRATT & WHITNEY CANADA CORP., Longueuil (CA)

(72) Inventors: Ahmad Cheikhzen, Montreal (CA); Victor Sa Melo, Cambridge (CA); Penny Nicolaidis, Mont Royal (CA); Daniel Alecu, Brampton (CA); Michel Labbe, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/516,270

(22) Filed: Nov. 21, 2023

(51) Int. Cl.
| | | |
|---|---|---|
| *F01M 13/00* | (2006.01) | |
| *B64D 27/10* | (2006.01) | |
| *F01M 11/00* | (2006.01) | |
| *F01M 11/04* | (2006.01) | |
| *F01M 11/12* | (2006.01) | |

(52) U.S. Cl.
CPC ............. *F01M 13/00* (2013.01); *B64D 27/10* (2013.01); *F01M 11/04* (2013.01); *F01M 11/12* (2013.01); *F01M 11/0004* (2013.01); *F01M 2011/0491* (2013.01)

(58) Field of Classification Search
CPC ........... F01M 2011/0491; F01M 11/12; F01M 11/04; F01M 13/0405; F16N 19/003; F01D 25/183; F05D 2240/58; F05D 2230/72
USPC ....................................................... 184/6.11
See application file for complete search history.

(56) References Cited

U.S. PATENT DOCUMENTS

| | | | | |
|---|---|---|---|---|
| 2,333,711 A | * | 11/1943 | Dwiggins | G01F 23/04 33/717 |
| 3,371,418 A | * | 3/1968 | Moeller | G01F 23/04 215/360 |
| 3,377,708 A | * | 4/1968 | Gassman | B65D 90/34 33/727 |
| 3,662,470 A | * | 5/1972 | Sasgen | G01F 23/04 33/731 |
| 3,722,102 A | * | 3/1973 | Jackson | G01F 23/04 33/731 |
| 4,067,113 A | * | 1/1978 | Haines | G01F 23/04 33/727 |
| 4,155,166 A | * | 5/1979 | Rochow | G01F 23/04 33/727 |
| 4,285,238 A | * | 8/1981 | Wilson | G01K 13/02 374/E13.006 |

(Continued)

*Primary Examiner* — Henry Y Liu
(74) *Attorney, Agent, or Firm* — NORTON ROSE FULBRIGHT CANADA LLP

(57) ABSTRACT

An oil filler assembly, has: a filler tube extending from a bottom end to a top end; a non-return valve having a tube side and a tank side; a cap assembly including a cap removably secured to the filler tube and a dipstick projecting from the cap; a vent having an inlet connected to the tank side and an outlet connected to the tube side, the vent defining a flow path bypassing the non-return valve; and a safety valve connected to the vent and having an open configuration in which fluid flow is permitted and a closed configuration in which fluid flow is prevented, the safety valve being engageable by the cap assembly to bias the safety valve in the open configuration when the cap is secured to the top end, the safety valve being in the closed configuration when the cap assembly is detached from the top end.

20 Claims, 4 Drawing Sheets

(56) References Cited

U.S. PATENT DOCUMENTS

| | | | | |
|---|---|---|---|---|
| 4,331,185 A * | 5/1982 | Rinaldo | ............... | G01F 23/04 |
| | | | | 141/285 |
| 4,651,428 A * | 3/1987 | Allaria | ............... | B64D 37/10 |
| | | | | 33/721 |
| 4,787,528 A * | 11/1988 | Harris | ............... | B60K 15/0406 |
| | | | | 220/288 |
| 5,186,220 A | 2/1993 | Scharrer | | |
| 5,373,957 A | 12/1994 | Gryc | | |
| 5,718,281 A * | 2/1998 | Bartalone | ............... | F01P 11/029 |
| | | | | 165/41 |
| 5,730,183 A * | 3/1998 | Kremsler | ............... | F16K 17/19 |
| | | | | 137/853 |
| 5,829,153 A * | 11/1998 | Hitchock | ............... | G01F 23/04 |
| | | | | 33/728 |
| 6,279,247 B1 * | 8/2001 | Neitzel | ............... | F16C 11/045 |
| | | | | 33/727 |
| 6,634,396 B2 * | 10/2003 | Ozawa | ............... | B67D 7/0288 |
| | | | | 141/285 |
| 6,926,121 B2 * | 8/2005 | Gates | ............... | F01M 11/12 |
| | | | | 184/88.1 |
| 7,100,744 B2 * | 9/2006 | Kettle | ............... | G01F 23/04 |
| | | | | 184/92 |
| 7,677,277 B2 | 3/2010 | Thompson et al. | | |
| 7,678,169 B1 * | 3/2010 | Gwin | ............... | B01D 45/06 |
| | | | | 123/41.86 |
| 7,959,026 B2 * | 6/2011 | Bertani | ............... | E04B 2/7416 |
| | | | | 215/370 |
| 8,042,705 B2 * | 10/2011 | Ligorio | ............... | F01M 11/04 |
| | | | | 220/254.1 |
| 9,182,263 B2 * | 11/2015 | Oh | ............... | G01F 23/045 |
| 9,630,694 B1 * | 4/2017 | Jaszewski | ............... | F01M 11/12 |
| 9,810,565 B2 * | 11/2017 | Inokura | ............... | G01F 23/04 |
| 10,065,722 B1 * | 9/2018 | Jaszewski | ............... | F16H 57/0441 |
| 10,527,479 B2 * | 1/2020 | Sonnenberg | ............... | G01F 23/04 |
| 10,975,740 B2 * | 4/2021 | Daniel | ............... | F01M 11/04 |
| 11,512,636 B2 * | 11/2022 | Beaulieu | ............... | F02C 7/06 |
| 11,702,967 B2 * | 7/2023 | Bertani | ............... | F16N 19/003 |
| | | | | 220/212 |
| 11,787,601 B2 * | 10/2023 | Kulkarni | ............... | B60K 15/0406 |
| | | | | 215/200 |
| 11,859,521 B2 * | 1/2024 | Rosenberger | ............... | G01F 23/04 |
| 2004/0065512 A1 | 4/2004 | Gates | | |
| 2008/0135553 A1 * | 6/2008 | Ligorio | ............... | G01F 23/04 |
| | | | | 220/203.23 |
| 2013/0305552 A1 * | 11/2013 | Krishnamurthy | ............... | G01F 23/04 |
| | | | | 33/728 |
| 2021/0003051 A1 * | 1/2021 | Daniel | ............... | F01M 11/04 |
| 2021/0231055 A1 * | 7/2021 | Beaulieu | ............... | F16N 23/00 |
| 2021/0246816 A1 * | 8/2021 | Rosenberger | ............... | G01F 23/04 |
| 2022/0243624 A1 * | 8/2022 | Bertani | ............... | F16N 19/003 |

* cited by examiner

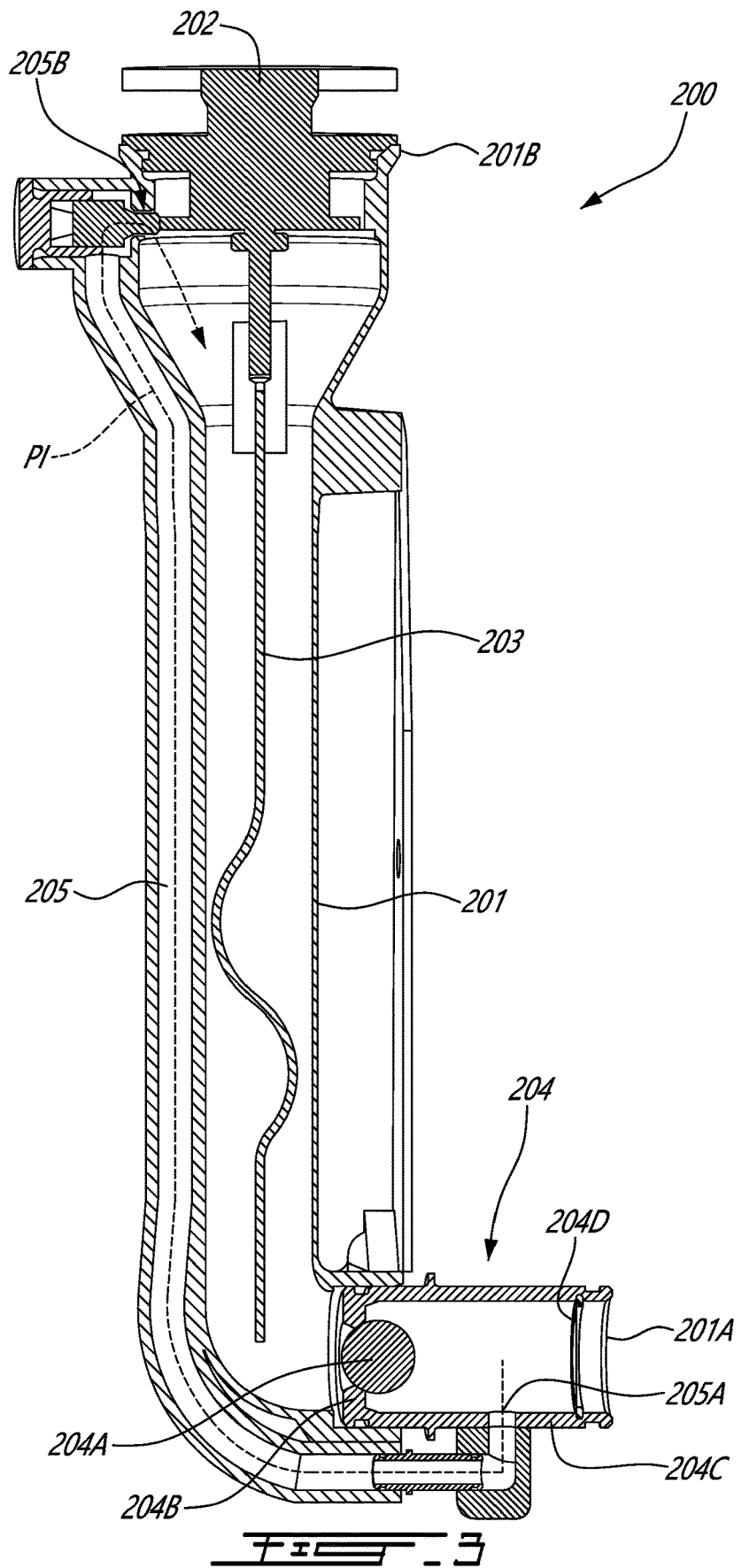

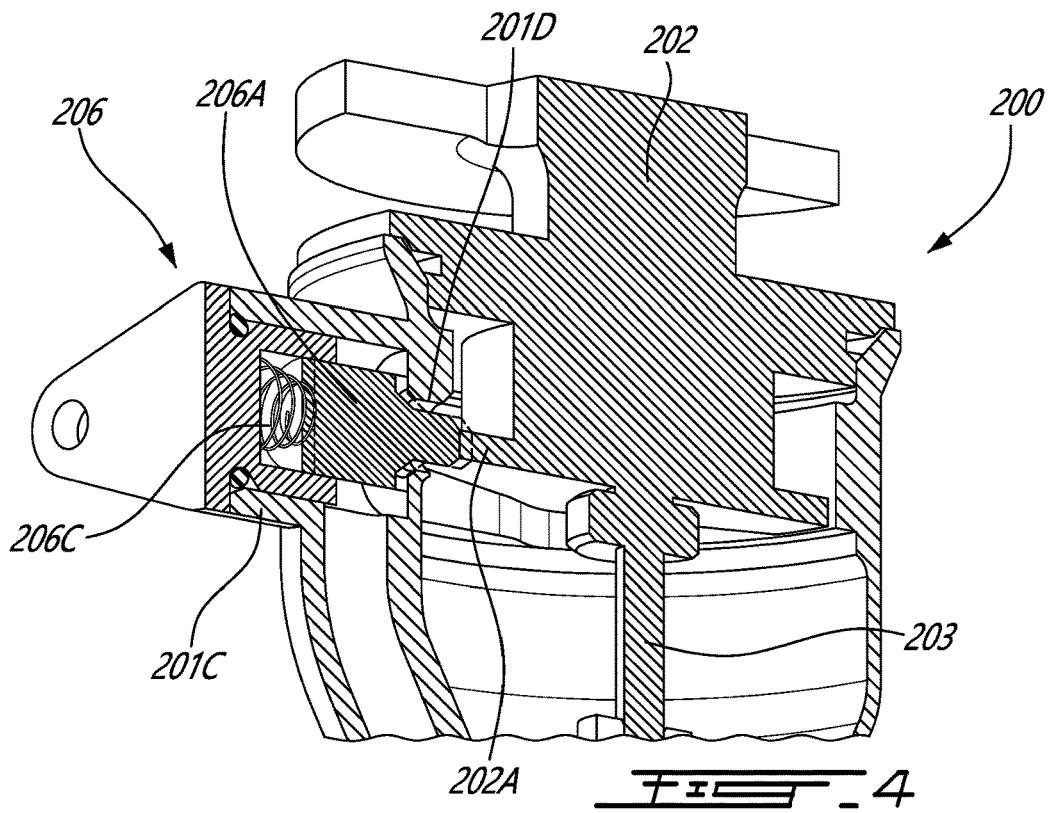
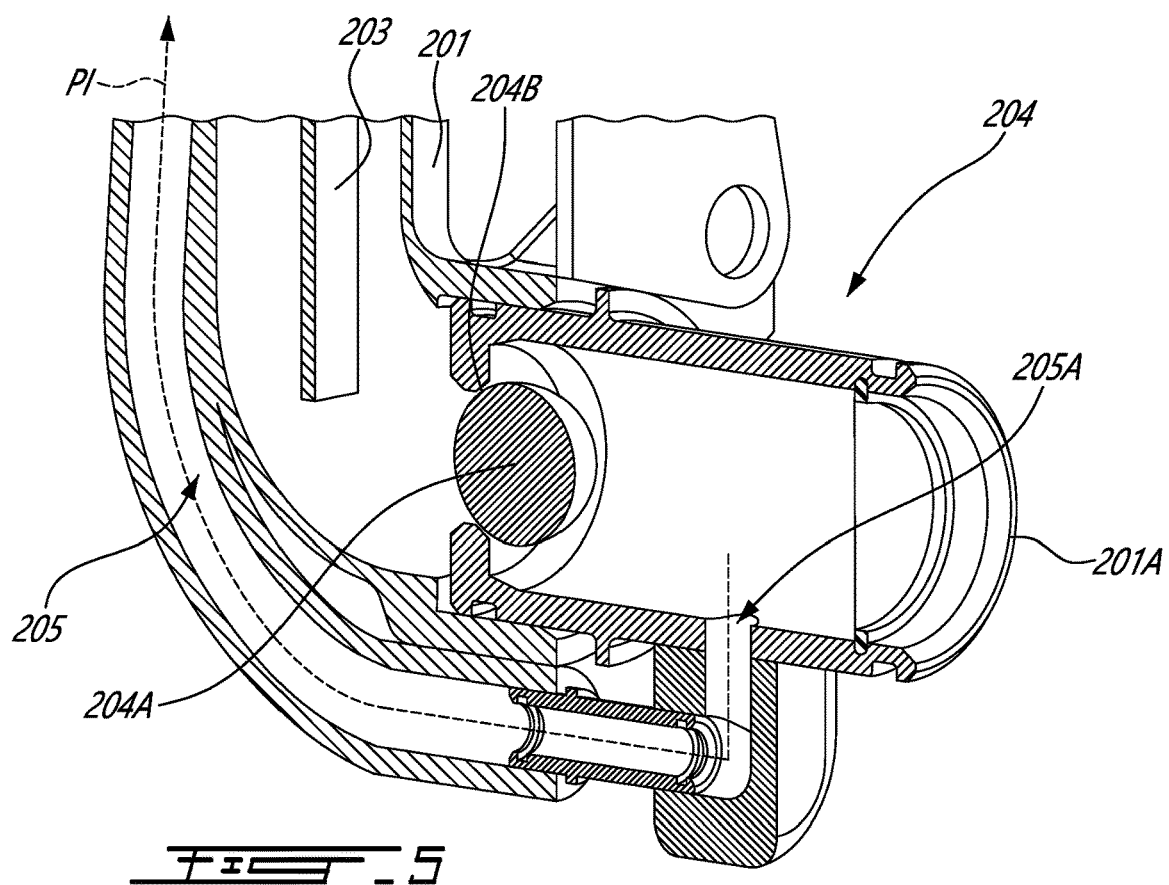

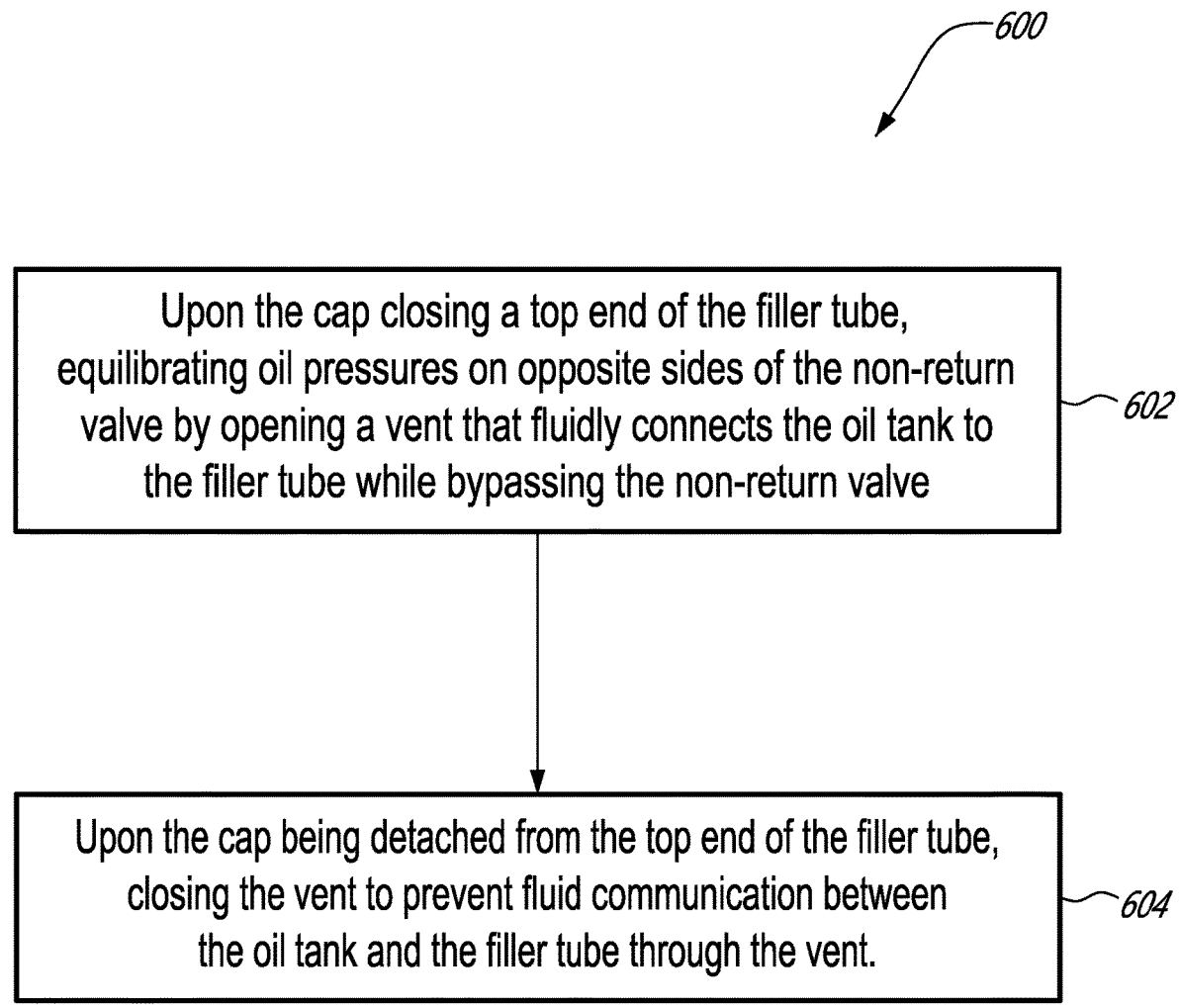

FILLER-CAP ACTIVATED VALVE IN FILLER-NECK OIL VENT

TECHNICAL FIELD

The disclosure relates generally to oil systems of aircraft engines and, more particularly, to systems and methods used for determining a level of oil in an oil tank of such engines and for filling the oil tank.

BACKGROUND

Aircraft engines, such as gas turbine engines, include an oil system for distributing oil to required portions of the engine for lubrication and/or cooling purposes. For example, oil may be directed to and from a bearing cavity of the aircraft engine. It may be required to add some oil in an oil tank of the oil system. To do so, a filler tube may be used. The filler tube is closed off with a cap and a dipstick is secured to the cap. The dipstick is used to determine a level of oil in the oil tank. In some cases, a volume of air in the filler tube may cause a false reading on the dipstick. Improvements are therefore sought.

SUMMARY

In one aspect, there is provided an oil filler assembly for an aircraft engine, comprising: a filler tube extending from a bottom end to a top end; a non-return valve having a tube side fluidly connected to the filler tube and a tank side fluidly connectable to an oil tank; a cap assembly including a cap removably secured to the top end of the filler tube, the cap assembly including a dipstick projecting from the cap into the filler tube; a vent having an inlet fluidly connected to the tank side of the non-return valve and an outlet fluidly connected to the tube side of the non-return valve, the vent defining a flow path bypassing the non-return valve; and a safety valve fluidly connected to the vent, the safety valve having an open configuration in which fluid flow through the outlet of the vent is permitted and a closed configuration in which fluid flow through the outlet of the vent is prevented, the safety valve being engageable by the cap assembly to bias the safety valve in the open configuration when the cap is secured to the top end of the filler tube, the safety valve being in the closed configuration when the cap assembly is detached from the top end.

The oil filler assembly described above may include any of the following features, in any combinations.

In some embodiments, the safety valve is a spring-loaded valve engageable by a feature on the cap assembly to move the safety valve in the open configuration when the cap is secured to the top end of the filler tube.

In some embodiments, the spring-loaded valve is received within a housing secured to a wall of the filler tube, the wall of the filler tube defining an aperture, the spring-loaded valve having valve member blocking the aperture in the closed configuration and at least partially offset from the aperture in the open configuration.

In some embodiments, the spring-loaded valve has a biasing member biasing the valve member in the closed configuration, the feature being a tab located on the cap, the tab maintaining the valve member at least partially offset from the aperture when the cap is secured to the top end of the filler tube.

In some embodiments, the cap is non-axisymmetric, the feature engaged to the spring-loaded valve in a limited number of orientations of the cap relative to the filler tube.

In some embodiments, the safety valve is located proximate the top end of the filler tube.

In some embodiments, the non-return valve includes a conduit and a ball movable within the conduit, the conduit defining a seat, the non-return valve being closed when the ball is seated against the seat.

In some embodiments, the vent intersects the filler tube downstream of the seat.

In another aspect, there is provided an aircraft engine, comprising: an oil tank; a filler tube fluidly connected to the oil tank at a location selected such that an oil level in the filler tube is representative of an oil level in the oil tank; a non-return valve, the filler tube fluidly connected to the oil tank via the non-return valve; a cap assembly including a cap removably securable to a top end of the filler tube, the cap assembly including a dipstick projecting from the cap into the filler tube; a vent fluidly connecting the oil tank to the filler tube along a flow path bypassing the non-return valve; and a safety valve fluidly connected to the vent, the safety valve having an open configuration in which fluid communication between the oil tank and the filler tube through the vent is permitted and a closed configuration in which fluid communication between the oil tank and the filler tube through the vent is prevented, the safety valve being engageable by the cap assembly such that the safety valve is in the open configuration when the cap is secured to the top end and in the closed configuration when the cap is detached from the top end of the filler tube.

The aircraft engine described above may include any of the following features, in any combinations.

In some embodiments, the safety valve is a spring-loaded valve engageable by a feature on the cap assembly to move the safety valve in the open configuration when the cap is secured to the top end of the filler tube.

In some embodiments, the spring-loaded valve is received within a housing secured to a wall of the filler tube, the wall of the filler tube defining an aperture, the spring-loaded valve having valve member blocking the aperture in the closed configuration and at least partially offset from the aperture in the open configuration.

In some embodiments, the spring-loaded valve has a biasing member biasing the valve member in the closed configuration, the feature being a tab located on the cap, the tab maintaining the valve member at least partially offset from the aperture when the cap is secured to the top end of the filler tube.

In some embodiments, the cap is non-axisymmetric, the feature engaged to the spring-loaded valve in a limited number of orientations of the cap relative to the filler tube.

In some embodiments, the safety valve is located proximate the top end of the filler tube.

In some embodiments, the non-return valve includes a conduit and a ball movable within the conduit, the conduit defining a seat, the non-return valve being closed when the ball is seated against the seat.

In some embodiments, the vent intersects the filler tube downstream of the seat.

In yet another aspect, there is provided a method for mitigating detrimental effects of air in a filler tube of an aircraft engine, the filler tube fluidly connected to an oil tank via a non-return valve, the filler tube closable with a cap connected to a dipstick, the method comprising: upon the cap closing a top end of the filler tube, equilibrating oil pressures on opposite sides of the non-return valve by opening a vent that fluidly connects the oil tank to the filler tube while bypassing the non-return valve; and upon the cap being detached from the top end of the filler tube, closing the vent to prevent fluid communication between the oil tank and the filler tube through the vent.

The method described above may include any of the following features, in any combinations.

In some embodiments, the opening of the vent includes opening the vent with a feature on the cap or the dipstick that engages a safety valve fluidly connected to the vent.

In some embodiments, the safety valve is a spring-loaded valve having a valve member biased in engagement with an aperture defined through a wall of the filler tube, the opening of the vent with the feature includes pushing the valve member with the feature.

In some embodiments, the opening of the vent with the feature includes opening the vent with a tab of the cap.

DESCRIPTION OF THE DRAWINGS

Reference is now made to the accompanying figures in which:

FIG. 3 is a cutaway view of a filler tube assembly in accordance with one embodiment for the oil system of FIG. 2;

FIG. 4 is an enlarged view of a portion of FIG. 3;

FIG. 5 is an enlarged view of another portion of FIG. 3; and

FIG. 6 is a flowchart illustrating steps of a method for mitigating effects of air in the filler tube assembly of FIG. 3.

DETAILED DESCRIPTION

Figure 1:
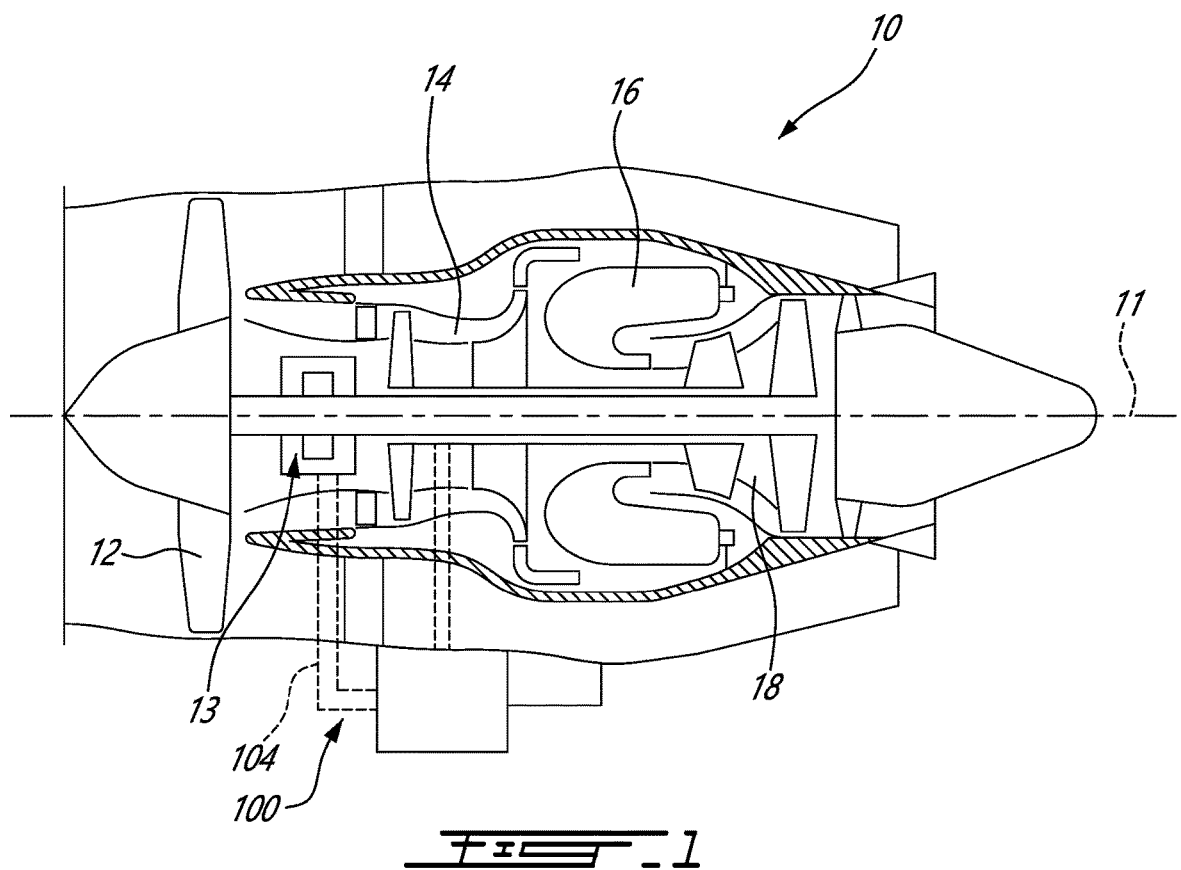
FIG. 1 is a schematic cross sectional view of an aircraft engine provided in the form of a gas turbine engine.

FIG. 1 illustrates an aircraft engine, such as a gas turbine engine 10, of a type preferably provided for use in subsonic flight. The gas turbine engine 10 includes in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

It will be appreciated that the principle of the present disclosure may be applied to any aircraft engines including a lubrication system or a cooling system, such as turbofan, turboprop, turboshaft, internal combustion engines, and so on.

Figure 2:
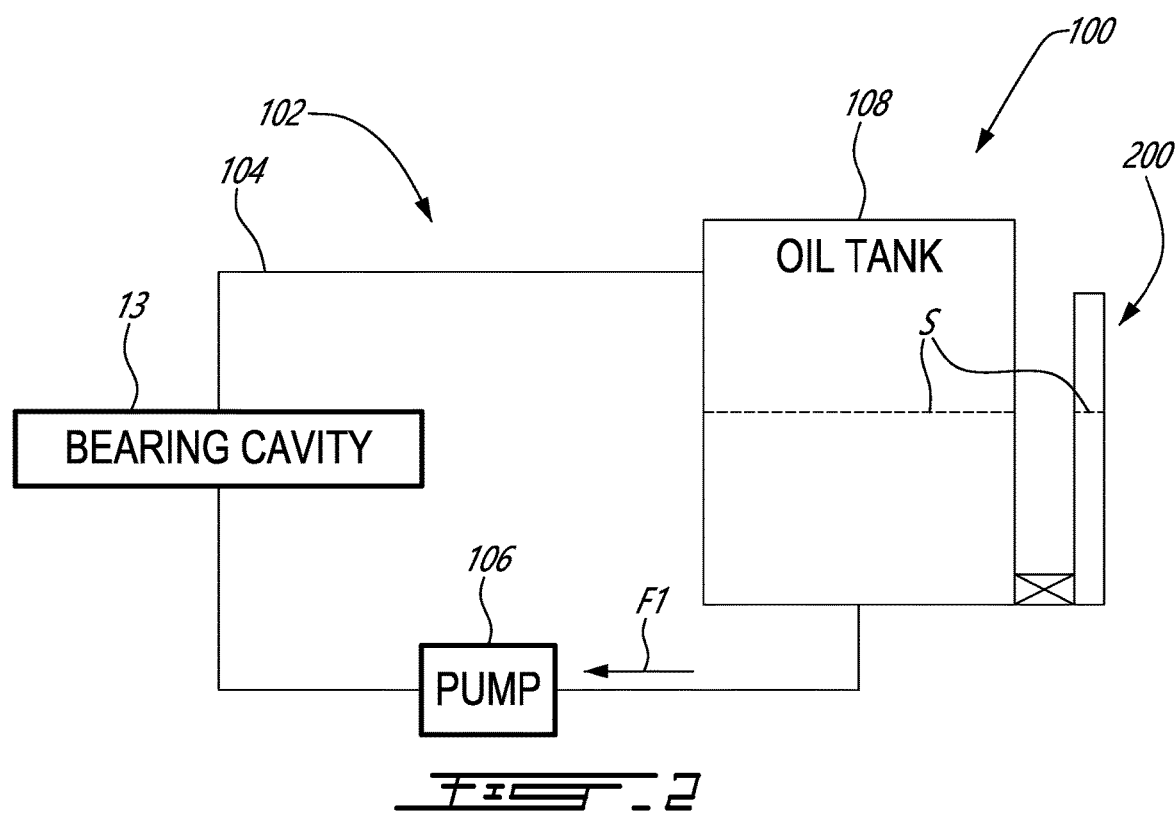
FIG. 2 is a schematic view of an oil system in accordance with one embodiment for the aircraft engine of FIG. 1.

Referring to FIGS. 1 and 2, the gas turbine engine 10 includes an oil system 100 for lubricating and/or cooling components in need of lubrication and/or cooling. These components may include, for instance, a bearing cavity 13 of the gas turbine engine 10, gearboxes, and so on. The bearing cavity 13 may include a plurality of bearing cavities for the different bearings of the gas turbine engine 10. The bearing cavity 13 is an enclosure surrounding a shaft (e.g., high-pressure shaft, low-pressure shaft) of the gas turbine engine 10 and containing one or more bearing(s). The bearing cavity 13 is supplied with a flow of oil F1 during operation to maintain proper lubricating conditions for the bearings. Used oil is scavenged out of the bearing cavity 13 and returned back to a reservoir.

In the embodiment shown, the oil system 100 includes an oil circuit 102 including conduits 104 for flowing the oil. A pump 106 is used for driving the flow of the oil F1 in the oil circuit 102. The oil system 100 includes an oil tank 108 that contains a volume of the oil. The oil system 100 is operable to draw oil from the oil tank 108 and to flow the oil within the conduits 104 to distribute the oil into the different components requiring lubrification/cooling. Oil is scavenged and flown back to the oil tank 108. The oil system 100 may also include additional components such as valve(s), heat exchangers, filters, scavenged pump(s), etc.

In some cases, it may be required to verify a level of oil in the oil tank 108. To do so, a filler tube assembly 200 may be used. The filler tube assembly 200 is fluidly connected to the oil tank 108 at or proximate a bottom of the oil tank 108. Therefore, the filler tube assembly 200 and the oil tank 108 may define a U-shape structure. Therefore, the level of oil in the oil tank 108, denoted by line S in FIG. 2, may be the same in the oil tank 108 as in the filler tube assembly 200. As known in the art, the filler tube assembly 200 may include a dipstick that defines markings indicating if the level of oil is adequate, or if more oil is to be added in the oil tank 108.

It will be appreciated that the bottom end 201A of the filler tube 201 is connected to the oil tank 108 at a location that permits oil to flow from the oil tank 108 into the filler tube 201. Put differently, the filler tube 201 is connected to the oil tank 108 such that an oil level in the filler tube 201 is representative of an oil level in the oil tank 108.

Referring now to FIG. 3, the filler tube assembly 200 is described in more detail. The filler tube assembly 200 includes a filler tube 201 extending from a bottom end 201A to a top end 201B. The bottom end 201A is fluidly connected to the bottom end of the oil tank 108 as shown in FIG. 2. The top end 201B of the filler tube assembly 200 is selectively open or close by a cap assembly that includes a cap 202. The top end 201B defines an inlet of the oil tank 108 as it is via this port that oil may be added to the oil tank 108. The cap 202 is used to close the top end 201B of the filler tube assembly 200 to avoid oil leaking out of the filler tube assembly 200 during flight. The cap 202 is therefore removably securable to the top end 201B. Any suitable mechanism, such as bayonet, threads, and so on may be used to removably secure the cap 202 to the filler tube 201.

The cap assembly of the filler tube assembly 200 further includes a dipstick 203 secured to the cap 202 and extending into the filler tube 201 towards the bottom end 201A. The dipstick 203 is received within the filler tube 201 and has a length sufficient to be at least partially submerged in oil contained in the filler tube 201. The dipstick 203 may have markings on it indicating different levels of oil as known in the art.

In the embodiment shown, the filler tube assembly 200 includes a valve 204, which is herein a non-return valve (e.g., check valve), fluidly connected to the filler tube 201 proximate the bottom end 201A. The purpose of this valve 204 is to protect loss of oil from the oil tank during flight if by inadvertence the cap was forgotten during oil replenishment. The valve 204 has a tube side fluidly connected to the filler tube 201 and a tank side fluidly connected to the oil tank 108. In the embodiment shown, the valve 204 is located into a horizontal section of the filler tube 201. The valve 204 is operable to selectively fluidly connect the filler tube 201 to the oil tank 108. More specifically, the valve 204 is used as a safety feature to keep the oil in the oil tank 108 during manoeuvre of the aircraft (e.g., pitch, roll, etc). The valve 204 is depicted as a ball valve, but any other suitable valve may be used such as, for instance, any suitable check valve, which may use a clapet or any other suitable valve member. The valve 204 includes a ball 204A and a seat 204B. The ball 204A is movable within a conduit 204C defining a portion of the filler tube 201. The valve 204 is in a closed configuration when the ball 204A is abutted against the seat 204B and in an opened configuration when the ball 204A is spaced apart from the seat 204B. The valve 204 is configured such that, if the aircraft makes a manoeuvre that causes oil to flow in the filler tube 201, the oil will push the ball 204A against the seat 204B thereby preventing oil from overflowing in the filler tube 201. The valve 204 includes a stopper 204D at an opposite end of the conduit to prevent the ball from leaving the conduit.

It has been observed by the inventors of the present disclosure that, in some cases, a volume of air trapped inside the filler tube 201 between the cap 202 and the oil expands when an altitude of the aircraft is increasing since atmospheric pressure is decreasing. The air, which now takes more space, pushes on the oil that leaves the filler tube 201 to flow into the oil tank 108 through the valve 204 by unseating the ball 204A from the seat 204B. Then, when the aircraft is back on the ground, there is a discrepancy between the level of oil in the oil tank 108 and the level of oil in the filler tube 201. The greater height of oil in the oil tank 108 biases the ball 204A against the seat 204B thereby preventing oil from equilibrating between the filler tube 201 and the oil tank 108. In turn, this causes false reading of the oil level on the dipstick 203. Indeed, the dipstick 203 might indicate that there is not enough oil in the oil tank 108 while this may not actually be the case. The filler tube assembly 200 of the present disclosure may at least partially alleviate these drawbacks.

Still referring to FIG. 3, the filler tube assembly 200 includes a vent 205. In the embodiment shown, the vent 205 is a conduit parallel to the filler tube 201. The vent 205 is shown as being integrated to the filler tube 201. In other words, a body may define two conduits: the filler tube 201 and the vent 205. It will be appreciated that any suitable hose may be used to define the vent 205. The vent 205 has an inlet 205A downstream of the valve 204, more specifically, downstream of the seat 204B, and an outlet 205B upstream of the valve 204. Expressions "upstream" and "downstream" are in relation to a flow from the filler tube 201 into the oil tank 108. The outlet 205B is fluidly connected to the filler tube 201 upstream of the valve 204. The vent 205 thus intersects the filler tube 201 downstream of the seat 204B and intersects the filler tube 201 upstream of the seat 204B. The vent 205 defines a flow path P1 bypassing the valve 204. Put differently, the vent 205 provides an alternative path to fluidly connect the oil tank 108 to the filler tube 201 that is independent of the valve 204. In other words, the vent 205 fluidly connects the oil tank 108 to the filler tube 201 along the flow path P1 while bypassing the valve 204. Hence, even if the valve 204 is biased in the closed configuration by the difference in oil pressures exerted on opposite sides of the ball 204A, the oil may flow from the oil tank 108 into the filler tube 201 while bypassing the valve 204 to equilibrate the fluid pressure on the opposite sides of the ball 204A.

Referring now to FIG. 4, in the depicted embodiment, care should be taken to ensure that the vent 205 does not leak oil if, for instance, the cap 202 releases from the top end of the filler tube 201 during operation of the gas turbine engine 10. Therefore, the filler tube assembly 200 may further include a safety valve 206. The safety valve 206 is, in the present embodiment, proximate or at the top end 201B of the filler tube 201, but may be located at any other locations along the vent 205. The safety valve 206 is fluidly connected to the vent 205. The safety valve 206 has an open configuration in which fluid communication through the vent 205 is permitted and a closed configuration in which fluid communication through the vent 205 is prevented. The safety valve 206 is engageable by the cap assembly such that the safety valve 206 is in the open configuration when the cap 202 is secured to the top end 201B and in the closed configuration when the cap 202 is detached from the top end 201B. Put differently, the safety valve 206 is engageable by the cap assembly to bias the safety valve 206 in the open configuration when the cap 202 is secured to the top end 201B. The safety valve 206 is in the closed configuration when the cap 202 is detached from the top end 201B.

In the present embodiment, the safety valve 206 is a spring-loaded valve engageable by a feature on the cap assembly to move the safety valve 206 in the open configuration when the cap 202 is secured to the top end 201B of the filler tube 201. The feature may be a tab 202A defined by the cap 202. It may alternatively be a disk or other member secured to the dipstick 203. The safety valve 206 includes a valve member 206A received within a housing 201C, which may be defined by the filler tube 201. A biasing member 206C, such as a spring, is contained within the housing 206B and biases the valve member 206A in the closed configuration.

More specifically, a wall of the filler tube 201 defines an aperture 201D. A portion of the valve member 206A blocks the aperture 201D in the closed configuration and is at least partially offset form the aperture 201D in the open configuration. The expression "at least partially offset" implies that there is a gap between the valve member and the aperture to allow fluid communication through the aperture. The safety valve 206 is shown in the open configuration in FIG. 4. Dashed lines are used in FIG. 4 to denote the closed configuration of the safety valve 206.

As shown in FIG. 4, the tab 202A abuts the valve member 206A to maintain the valve member 206A at least partially offset form the aperture 201D to maintain the safety valve 206 in the open configuration. When the cap 202 is removed, the tab 202A no longer engages the valve member 206A and the valve member 206A blocks the aperture 201D to prevent fluid communication from the oil tank 108 to the filler tube 201 via the vent 205. The cap 202 may be non-axisymmetric such that the feature (e.g., the tab 202A) engages the valve member 206A in a limited number (e.g., 1, 2, etc) of orientations of the cap 202 relative to the filler tube 201. In some embodiments, the cap 202 may be secured to the top end 201B of the filler tube 201 with a bayonet mechanism. The cap 202 is first inserted into the filler tube 201 and rotated to create a locking engagement with the filler tube 201. Only when this locking engagement is created will the tab 202A abuts the valve member 206A to bias the safety valve 206 in the opened configuration.

As shown in FIG. 5, when the ball 204A of the valve 204 is biased against the seat 204B by the oil in the oil tank 108 exerting a greater force on the ball 204A than a force exerted by the oil in the filler tube 201, oil may still leave the oil tank 108 via the vent 205 and along the flow path P1 thereby bypassing the valve 204. The vent 205 allows a portion of the oil contained in the oil tank 108 to leave the oil tank 108 to re-equilibrate the oil pressure on the ball 204A. The oil that flows into the vent 205 from the oil tank 108 does not need to reach the outlet 205B of the vent 205. The vent 205 allows air to escape the vent 205 thereby permitting the oil to enter the vent 205. In some cases, for instance if an aircraft equipped with the gas turbine engine 10 makes a roll or pitch manoeuvre, it may occur that some of the oil will reach the outlet 205B of the vent 205. This oil will then flow back into the filler tube 201 since the outlet 205B of the vent 205 is fluidly connected to the filler tube 201.

This may allow a balancing of the pressure on opposite sides of the ball 204A, which may at least partially eliminate the false readings on the dipstick 203 caused by the oil in the filler tube 201 being at least partially flushed out in the oil tank 108 following a decrease in atmospheric pressure during flight. More specifically, this may allow balancing of the pressure on both sides of the non-return valve, which may prevent the non-return valve from getting stuck in a closed position during engine operation.

Referring now to FIG. 6, a method for mitigating detrimental effects of air in the filler tube 201 is shown at 600. The method 600 includes, upon the cap 202 closing the top end 201B of the filler tube 201, equilibrating oil pressures on opposite sides of the valve by opening the vent 205 that fluidly connects the oil tank 108 to the filler tube 201 while bypassing the valve 204 thereby permitting a portion of oil in the the oil tank 108 to leave the oil tank 108 while the valve 204 is in a closed configuration at 602; and upon the cap 202 detached from the top end 201B of the filler tube 201, closing the vent 205 thereby preventing fluid communication between the oil tank 108 and the filler tube 201 through the vent 205 at 604.

The method 600 includes pushing a portion of oil contained in the filler tube 201 into the oil tank 108 through the valve 204 by unseating the ball 204A from the seat 204B with a pressure exerted on the ball 204A by a volume of air expanding in the filler tube 201 with an increase of an altitude of the aircraft engine; and equilibrating the oil pressure exerted on opposite sides of the ball 204A by permitting an oil flow from the oil tank 108 into the filler tube 201 via the vent 205 while bypassing the valve 204.

In the disclosed embodiment, the opening of the vent 205 at 602 includes opening the vent 205 with a feature on the cap 202 that engages the safety valve 206 fluidly connected to the vent 205. The opening of the vent 205 with the feature may include pushing the valve member 206A such that a gap is created between the aperture 201D and the valve member 206A with the feature of the cap 202. The opening of the vent 205 with the feature may include opening the vent with the tab of the cap.

In an alternate embodiment, instead of the cap 202 engaging the valve, the spring-valve may be incorporated anywhere along the filler tube 201 may be activated by a disk that is integrated into the dipstick 203. It may be required to install the dipstick 203 correctly for the disk to activate the spring-valve. The vent 205 may be integrated into an elbow of the filler tube 201 into one without a transfer tube. That is, the vent and the filler tube that houses the ball valve housing may be integrated.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An oil filler assembly for an aircraft engine, comprising:
    a filler tube extending from a bottom end to a top end;
    a non-return valve having a tube side fluidly connected to the filler tube and a tank side fluidly connectable to an oil tank;
    a cap assembly including a cap removably secured to the top end of the filler tube, the cap assembly including a dipstick projecting from the cap into the filler tube;
    a vent having an inlet fluidly connected to the tank side of the non-return valve and an outlet fluidly connected to the tube side of the non-return valve, the vent defining a flow path bypassing the non-return valve; and
    a safety valve fluidly connected to the vent, the safety valve having an open configuration in which fluid flow through the outlet of the vent is permitted and a closed configuration in which fluid flow through the outlet of the vent is prevented, the safety valve being engageable by the cap assembly to bias the safety valve in the open configuration when the cap is secured to the top end of the filler tube, the safety valve being in the closed configuration when the cap assembly is detached from the top end.

2. The oil filler assembly of claim 1, wherein the safety valve is a spring-loaded valve engageable by a feature on the cap assembly to move the safety valve in the open configuration when the cap is secured to the top end of the filler tube.

3. The oil filler assembly of claim 2, wherein the spring-loaded valve is received within a housing secured to a wall of the filler tube, the wall of the filler tube defining an aperture, the spring-loaded valve having valve member blocking the aperture in the closed configuration and at least partially offset from the aperture in the open configuration.

4. The oil filler assembly of claim 3, wherein the spring-loaded valve has a biasing member biasing the valve member in the closed configuration, the feature being a tab located on the cap, the tab maintaining the valve member at least partially offset from the aperture when the cap is secured to the top end of the filler tube.

5. The oil filler assembly of claim 2, wherein the cap is non-axisymmetric, the feature engaged to the spring-loaded valve in a limited number of orientations of the cap relative to the filler tube.

6. The oil filler assembly of claim 1, wherein the safety valve is located proximate the top end of the filler tube.

7. The oil filler assembly of claim 1, wherein the non-return valve includes a conduit and a ball movable within the conduit, the conduit defining a seat, the non-return valve being closed when the ball is seated against the seat.

8. The oil filler assembly of claim 7, wherein the vent intersects the filler tube downstream of the seat.

9. An aircraft engine, comprising:
an oil tank;
a filler tube fluidly connected to the oil tank at a location selected such that an oil level in the filler tube is representative of an oil level in the oil tank;
a non-return valve, the filler tube fluidly connected to the oil tank via the non-return valve;
a cap assembly including a cap removably securable to a top end of the filler tube, the cap assembly including a dipstick projecting from the cap into the filler tube;
a vent fluidly connecting the oil tank to the filler tube along a flow path bypassing the non-return valve; and
a safety valve fluidly connected to the vent, the safety valve having an open configuration in which fluid communication between the oil tank and the filler tube through the vent is permitted and a closed configuration in which fluid communication between the oil tank and the filler tube through the vent is prevented, the safety valve being engageable by the cap assembly such that the safety valve is in the open configuration when the cap is secured to the top end and in the closed configuration when the cap is detached from the top end of the filler tube.

10. The aircraft engine of claim 9, wherein the safety valve is a spring-loaded valve engageable by a feature on the cap assembly to move the safety valve in the open configuration when the cap is secured to the top end of the filler tube.

11. The aircraft engine of claim 10, wherein the spring-loaded valve is received within a housing secured to a wall of the filler tube, the wall of the filler tube defining an aperture, the spring-loaded valve having valve member blocking the aperture in the closed configuration and at least partially offset from the aperture in the open configuration.

12. The aircraft engine of claim 11, wherein the spring-loaded valve has a biasing member biasing the valve member in the closed configuration, the feature being a tab located on the cap, the tab maintaining the valve member at least partially offset from the aperture when the cap is secured to the top end of the filler tube.

13. The aircraft engine of claim 10, wherein the cap is non-axisymmetric, the feature engaged to the spring-loaded valve in a limited number of orientations of the cap relative to the filler tube.

14. The aircraft engine of claim 9, wherein the safety valve is located proximate the top end of the filler tube.

15. The aircraft engine of claim 9, wherein the non-return valve includes a conduit and a ball movable within the conduit, the conduit defining a seat, the non-return valve being closed when the ball is seated against the seat.

16. The aircraft engine of claim 15, wherein the vent intersects the filler tube downstream of the seat.

17. A method for mitigating detrimental effects of air in a filler tube of an aircraft engine, the filler tube fluidly connected to an oil tank via a non-return valve, the filler tube closable with a cap connected to a dipstick, the method comprising:
upon the cap closing a top end of the filler tube, equilibrating oil pressures on opposite sides of the non-return valve by opening a vent that fluidly connects the oil tank to the filler tube while bypassing the non-return valve; and
upon the cap being detached from the top end of the filler tube, closing the vent to prevent fluid communication between the oil tank and the filler tube through the vent.

18. The method of claim 17, wherein the opening of the vent includes opening the vent with a feature on the cap or the dipstick that engages a safety valve fluidly connected to the vent.

19. The method of claim 18, wherein the safety valve is a spring-loaded valve having a valve member biased in engagement with an aperture defined through a wall of the filler tube, the opening of the vent with the feature includes pushing the valve member with the feature.

20. The method of claim 19, wherein the opening of the vent with the feature includes opening the vent with a tab of the cap.

* * * * *